United States Patent [19]

Choe

[11] Patent Number: 4,694,048

[45] Date of Patent: Sep. 15, 1987

[54] THERMOPLASTIC POLYMERS CONTAINING REPEATING HYDRAZIDE GROUPS

[75] Inventor: Eui W. Choe, Randolph, N.J.

[73] Assignee: Celanese Corporation, New York, N.Y.

[21] Appl. No.: 854,274

[22] Filed: Apr. 21, 1986

[51] Int. Cl.$^4$ .............................. C08F 8/30; C08F 8/34
[52] U.S. Cl. ..................................... 525/376; 307/425; 350/356; 428/473.5; 525/326.7; 525/326.8; 525/327.2; 525/327.6; 526/262; 526/265
[58] Field of Search ................. 525/376, 327.2, 327.6, 525/326.7, 326.8; 526/262, 265; 428/473.5; 307/425; 350/356

[56] References Cited

U.S. PATENT DOCUMENTS 4,083,835  4/1978  Pohlemann et al. ................. 525/376

*Primary Examiner*—Harold D. Anderson
*Attorney, Agent, or Firm*—Depaoli & O'Brien

[57] ABSTRACT

In one embodiment this invention provides a nonlinear optical substrate which is a transparent film of a thermoplastic polymer containing recurring units corresponding to the formula:

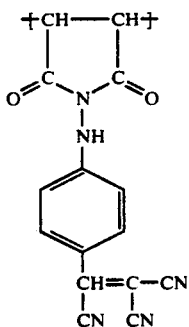

15 Claims, No Drawings

THERMOPLASTIC POLYMERS CONTAINING REPEATING HYDRAZIDE GROUPS

BACKGROUND OF THE INVENTION

It is known that organic and polymeric materials with large delocalized $\pi$-electron systems can exhibit nonlinear optical response, which in many cases is a much larger response than by inorganic substrates.

In addition, the properties of organic and polymeric materials can be varied to optimize other desirable properties, such as mechanical and thermoxidative stability and high laser damage threshold, with preservation of the electronic interactions responsible for nonlinear optical effects.

Thin films of organic or polymeric materials with large second-order nonlinearities in combination with silicon-based electronic circuitry have potential as systems for laser modulation and deflection, information control in optical circuitry, and the like.

Other novel processes occurring through third-order nonlinearity such as degenerate four-wave mixing, whereby real-time processing of optical fields occurs, have potential utility in such diverse fields as optical communications and integrated circuit fabrication.

Of particular importance for conjugated organic systems is the fact that the origin of the nonlinear effects is the polarization of the $\pi$-electron cloud as opposed to displacement or rearrangement of nuclear coordinates found in inorganic materials.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

The above-recited publications are incorporated herein by reference.

Of general interest with respect to the present invention is prior art relating to thermoplastic polymers containing recurring pendant amide or imide groups, such as that described in U.S. Pat. Nos. 2,977,334; 3,157,595; 3,684,777; 3,714,045; 4,121,026; 4,169,924; and 4,246,374.

Of particular interest with respect to the present invention is U.S. Pat. No. 4,083,835 which describes the production of copolymers that contain repeating succinic acid hydrazide units.

There is continuing research effort to develop new nonlinear optical organic systems for prospective novel phenomena and devices adapted for laser frequency conversion, information control in optical circuitry, light valves and optical switches. The potential utility of organic materials with large second-order and third-order nonlinearities for very high frequency application contrasts with the bandwidth limitations of conventional inorganic electrooptic materials.

Accordingly, it is an object of this invention to provide organic compositions which are characterized by a large delocalized conjugated $\pi$-electron system which can exhibit nonlinear optical response.

It is another object of this invention to provide novel thermoplastic polymers which are characterized by repeating charge asymmetric cyclic hydrazide units.

It is a further object of this invention to provide high performance nonlinear optical substrates.

Other objects and advantages of the present invention shall become apparent from the accompanying description and examples.

DESCRIPTION OF THE INVENTION

One or more objects of the present invention are accomplished by the provision of a thermoplastic polymer which contains recurring structural units corresponding to the formula:

where R is a substituent selected from hydrogen and alkyl groups, n is the integer zero or one, X is a substituent selected from nitro, cyano, trifluoromethyl and tricyanoethylene groups, and Y is a substituent selected from hydrogen, alkyl, nitro and cyano groups.

The weight average molecular weight of the thermoplastic polymer typically will vary in the range between about 500–500,00.

Preferably the repeating structural units comprise at least about 10 weight percent of the total polymer weight, e.g., between about 20–80 weight percent of the total polymer weight.

In the illustrated formula above, R is hydrogen or an alkyl group such as methyl, ethyl, propyl, butyl, pentyl, hexyl, decyl, and the like. Preferably R is hydrogen or a $C_1$–$C_4$-alkyl group such as methyl or butyl.

Thermoplastic polymers of particular interest are those corresponding to the formula above in which X is nitro and Y is hydrogen; X is nitro and Y is nitro; X is cyano and Y is hydrogen; X is trifluoromethyl and Y is hydrogen; and X is tricyanoethylene and Y is hydrogen.

In another embodiment, this invention provides a process for producing a thermoplastic polymer containing recurring hydrazide groups which comprise reacting a polymer containing repeating anhydride units corresponding to the formula:

where R is a substituent selected from hydrogen and alkyl groups, and n is the integer zero or one, with a hydrazine compound corresponding to the formula:

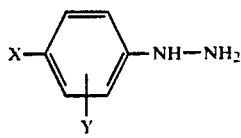

where X is a substituent selected from nitro, cyano, trifluoromethyl and tricyanoethylene groups, and Y is a substituent selected from hydrogen, alkyl, nitro and cyano groups, to produce a thermoplastic polymer containing repeating hydrazide units corresponding to the formula:

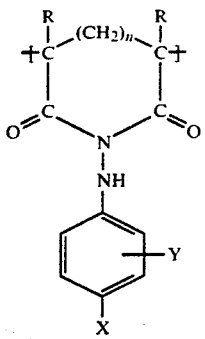

where R, n, X and Y are as previously defined.

The thermoplastic polyanhydride starting material employed in the process can be any one of the known polymers such as poly(acrylic anhydride) or poly(methacrylic anhydride). Other polyanhydride starting materials useful in the process include copolymers of maleic anhydride or alkyl-substituted maleic anhydride with comonomers such as ethylene, styrene, alkyl acrylate, alkyl methacrylate, vinylcarbazole, acrylamide, acrolein, acrylonitrile, and the like.

A thermoplastic polymer containing repeating hydrazide units as defined above can be produced in accordance with the invention process embodiment by reacting a mixture of polyanhydride and hydrazine starting materials in a melt phase at a temperature between about 20°–250° C. at a subatmospheric, atmospheric or superatmospheric pressure.

An alternative procedure is to disperse or dissolve the polyanhydride and hydrazine starting materials in a solvent medium such as tetrahydrofuran, dimethylsulfoxide, dioxane, N,N-dimethylformamide, N-methylpyrrolidone, tetramethylurea or toluene, and heat the reaction medium as required to achieve the desired condensation reaction between anhydride and hydrazine groups to form repeating cyclic hydrazide units.

It is advantageous to remove the water byproduct continuously during the course of the condensation reaction to favor equilibrium formation of the desired cyclic hydrazide units.

Preferably the mole ratio of hydrazine to anhydride groups in the respective reactants is at least about 1:1 to effect conversion of all the anhydride groups to cyclic hydrazide units.

In a further embodiment, this invention provides a nonlinear optical medium comprising a substrate of a thermoplastic polymer which contains recurring structural units corresponding to the formula:

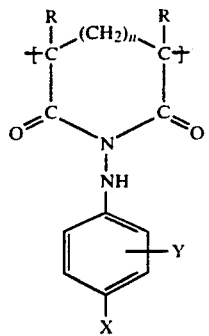

where R is a substituent selected from hydrogen and alkyl groups, n is the integer zero or one, X is a substituent selected from nitro, cyano, trifluoromethyl and tricyanoethylene groups, and Y is a substituent selected from hydrogen, alkyl, nitro and cyano groups.

A present invention nonlinear optical medium can be in the form of an optically transparent film.

A nonlinear optical medium as defined above is adapted for utility as a nonlinear optical lens component in a laser frequency converter device.

A nonlinear optical substrate can be in the form of a noncentrosymmetric configuration of aligned polymer molecules, and the substrate can exhibit a Miller's delta of at least about one square meter/coulomb. A noncentrosymmetric alignment of molecules can be induced with an external field. When the polymer molecules are in a random configuration, the substrate exhibits third order optical susceptibility $\chi^{(3)}$ harmonic response.

The term "Miller's delta" as employed herein with respect to second harmonic generation (SHG) is defined by Garito et al in Chapter 1, "Molecular Optics:- Nonlinear Optical Properties Of Organic And Polymeric Crystals"; ACS Symposium Series 233 (1983).

The quantity "delta" ($\delta$) is defined by the equation:

$$d_{ijk} = \epsilon_0 \chi_{ii}^{(1)} \chi_{jj}^{(1)} \chi_{kk}^{(1)} \delta_{ijk}$$

where terms such as $\chi_{ii}^{(1)}$ are the linear susceptibility components, and $d_{ijk}$, the second harmonic coefficient, is defined through $$\chi_{ijk}(-2\omega;\omega,\omega) = 2d_{ijk}(-2\omega;\omega,\omega)$$

The Miller's delta ($10^{-2}m^2/c$ at 1.06 μm) of various nonlinear optical crystalline substrates are illustrated by KDP (3.5), LiNbO$_3$ (7.5), GaAs (1.8) and 2-methyl-4-nitroaniline (160).

The term "external field" as employed herein refers to an electric or magnetic field which is applied to a substrate of mobile organic molecules, to induce dipolar alignment of the molecules parallel to the field.

The term "optically transparent" as employed herein refers to a liquid or solid medium which is transparent or light transmitting with respect to incident fundamental light frequencies and harmonic light frequencies. In a laser frequency converter, a present invention nonlinear optical lens medium is transparent to both the incident and exit light frequencies.

The term "charge asymmetric" as employed herein refers to the dipolarity that is characteristic of organic molecules containing an electron-withdrawing group which is in conjugation with an electron-donating group.

Field-induced Macroscopic Nonlinearity

The electronic origins of nonlinear optical effects in organic $\pi$-electronic systems is reviewed by D. J. Williams in Angew. Chem., Int. Ed. Engl., 23, 690 (1984); incorporated herein by reference.

As described in the review article, a technique has been developed for measuring $\beta$ without necessitating the incorporation of the molecule into noncentrosymmetric crystal structures. In this technique, called electric-field induced second-harmonic generation (EFISH), a strong DC electric field is applied to a liquid or a solution of the molecules of interest in order to remove the orientational averaging by statistical alignment of molecular dipoles in the medium. The induced second-order nonlinearity can then produce a signal at $2\frac{\omega}{8}$, from which $\beta$ can be extracted.

A schematic diagram of experimental system for measurement of $\beta$ by the EFISH technique is presented in the review article. As illustrated in the published diagram, the 1.06 $\mu$m output of a $Nd^{3+}$:YAG laser is split and directed into a sample and a reference cell. The sample cell is translated by a stepped-motor-controlled stage across the beam. The laser pulse is synchronized with a high-voltage DC pulse to induce harmonic generation in the cell. The 0.53 $\mu$m radiation is separated from the 1.06 $\mu$m pump beam by filters and a monochromator, and the harmonic intensity is detected by a photomultiplier tube. The signal-to-noise ratio can be improved with a boxcar averager. The reference beam is directed into a crystal such as quartz, whose second-order properties are well known, so that fluctuations in beam intensity can be readily corrected in the output data. The value of the nonlinear coefficient is obtained from the ratio of the signals of the sample cell and a reference material such as quartz or $LiNbO_3$ with known $\chi^{(2)}$.

A present invention charge asymmetric thermoplastic polymer is adapted to exhibit the external field-induced macroscopic nonlinearity required for second order harmonic generation.

Solid Organic Guest-host Substrates

In a further embodiment this invention provides nonlinear optically transparent host polymeric substrates having incorporated therein a distribution of guest molecules of a present invention oligomer or polymer.

Illustrative of this type of optical substrate is a polymethyl methacrylate film containing a distribution of present invention polymer molecules containing repeating cyclic hydrazide units.

If the distribution of guest molecules is random, there is orientational averaging by statistical alignment of the dipolar molecules in the polymeric host, and the optical substrate exhibits third order nonlinearity ($\chi^{(3)}$).

If the distribution of guest molecules is at least partially uniaxial in molecular orientation, then the optical substrate exhibits second order nonlinearity ($\chi^{(2)}$). One method for preparing polymeric films with large second-order nonlinear coefficients is to remove the orientational averaging of a dopant molecule with large $\beta$ by application of an external DC electric field to a softened film. This can be accomplished by heating the film above the host polymer glass-transition temperature $T_g$, then cooling the film below $T_g$ in the presence of the external field. The poling provides the alignment predicted by the Boltzmann distribution law.

The formation of a thin host polymer substrate containing guest molecules having, for example, uniaxial orthogonal molecular orientation can be achieved by inducing a dipolar alignment of the guest molecules in the substrate with an externally applied field of the type described above.

In one method a thin film of the host polymer (e.g., polymethyl methacrylate) containing guest molecules [e.g., poly(acryloyl 4-nitrophenylhydrazide) oligomer] is cast between electrode plates. The host polymer substrate then is heated to a temperature above the second-order transition temperature of the host polymer. A DC electric field is applied (e.g., at a field strength between about 400–100,000 V/cm) for a period sufficient to align the guest molecules in a unidirectional configuration parallel to the transverse field. Typically the orientation period will be in the range between about one second and one hour, as determined by factors such as guest molecular weight and field strength.

When the orientation of guest molecules is complete, the host polymer substrate is cooled below its second order transition temperature, while the substrate is still under the influence of the applied DC electric field. In this manner the uniaxial molecular orientation of guest molecules is immobilized in a rigid structure.

The uniaxial molecular orientation of the guest molecules in the host polymer substrate can be confirmed by X-ray diffraction analysis. Another method of molecular orientation measurement is by optical characterization, such as optical absorption measurements by means of a spectrophotometer with a linear polarization fixture.

The following examples are further illustrative of the present invention. The components and specific ingredients are presented as being typical, and various modifications can be derived in view of the foregoing disclosure within the scope of the invention.

EXAMPLE I

This Example illustrates a general procedure for the preparation of a cyclic hydrazide-containing thermoplastic polymer in accordance with the present invention.

A copolymer of 60 molar percent of styrene, 10 molar percent of ethyl acrylate and 30 molar percent of maleic anhydride is synthesized by solution polymerization of the monomers in N,N-dimethylformamide with 2.0 weight percent azodiisobutyronitrile catalyst t 75° C. for a period of six hours. The copolymer product has a weight average molecular weight of about 10,000.

The copolymer is reacted with a stoichiometric excess of 2,4-dinitrophenylhydrazine in N,N-dimethylformamide solution at 80° C. to produce a thermoplastic polymer characterized by repeating cyclic succinoyl 2,4-dinitrophenylhydrazide units.

EXAMPLE II

This Example illustrates the preparation of poly(methyacryloyl 4-cyanophenylhydrazide) which contains repeating cyclic glutaroyl 4-cyanophenylhydrazide units.

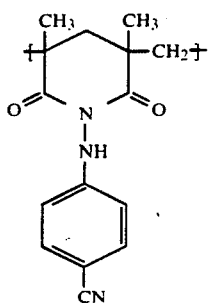

A 300 ml three-necked flask with a mechanical stirrer, inert-gas inlet and outlet, and a condenser/water-removal unit is charged with 10 g (0.65 mole) poly(methacrylic anhydride), 7.93 g (0.065 mole) of 4-cyanophenylhydrazine and 160 ml of N,N-dimethylacetamide.

The reaction medium is heated at 100° C. for 16 hours with stirring. After cooling, the reaction product mixture is poured into one liter of water to form a precipitate. The solid product is filtered, washed with 95% ethanol, and then dried to yield about 16 g of poly(methacryloyl 4-cyanophenylhydrazide) polymer product.

EXAMPLE III

This Example illustrates the preparation of a copolymer of octadecyl vinyl ether and maleic anhydride which contains repeating cyclic succinoyl 4-trifluoromethylphenylhydrazide units.

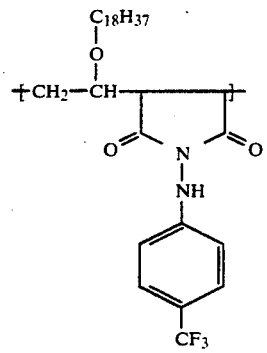

A 500 ml three-necked flask equipped with a mechanical stirrer, inert-gas inlet and outlet, and a condenser/water-removal unit is charged with 100 g of a 40% solution of octadecyl vinyl ether/maleic anhydride copolymer in toluene and with 20 g of 4-trifluoromethylphenylhydrazine in 100 ml of toluene.

The reaction medium is heated at 100° C. for 6 hours with stirring. The reaction product mixture is poured into two liters of 95% ethanol to precipitate the product. The product is filtered, washed with 95% ethanol, and dried to yield about 50 g of polymer product.

Similar results are obtained when the hydrazine reactant employed is 4-(tricyanoethylene)phenylhydrazine instead of 4-trifluoromethylphenylhydrazine.

EXAMPLE IV

This Example illustrates the preparation of a copolymer of styrene and maleic anhydride which contains repeating succinoyl 4-nitrophenylhydrazide units.

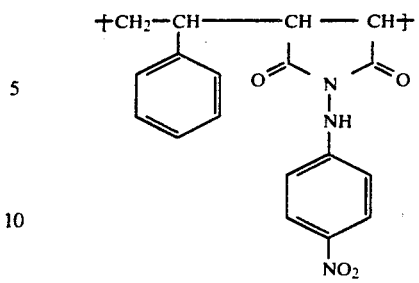

A 10 g quantity of poly(styrene-maleic anhydride) (1:1 mole ratio; M.W., 1600) is reacted with 7.57 g (0.0495 mole) of 4-nitrophenylhydrazine in 200 ml of N,N-dimethylformamide at 100° C. for 3 hours.

After distillation of the solvent at 200° C., the remaining viscous solution is poured into 500 ml of water to precipitate the polymer. The polymer is recovered by filtration, washed successively with water and 95% ethanol, and dried to yield about 14 g of poly(styrene-N-p-nitroanilinomaleimide), m.p., 270°–275° C.

EXAMPLE V

This Example illustrates the preparation of poly(N-p-nitroanilinomaleimide).

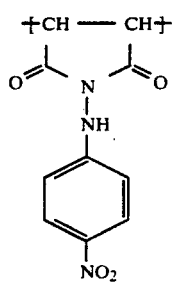

Following the procedure of Example IV, 5 g of poly(maleic anhydride) is reacted with 7.8 g (0.051 mole) of 4-nitrophenylhydrazine.

The recovered polymeric product has a softening point of 90°–115° C.

EXAMPLE VI

This Example illustrates the preparation of a thin substrate of thermoplastic polymer with a macroscopic noncentrosymmetric molecular orientation in accordance with the present invention.

Poly(methacryloyl 4-cyanophenylhydrazide) polymer as described in Example II is compression molded to form a film of about 500 micron thickness.

The molding is accomplished in a 30 ton press (Wabash Metal Products, Inc. Model #30-1010-2TMX) with programmed heating and cooling, and adjustable pressure. The platen temperature is set at 290° C. The polymer in particulate form is placed between two Kapton (DuPont polyimide) sheets and positioned between the two platens. The platens are closed and 6 tons pressure is applied for 2 minutes. The platens are then cooled to 230° C. within thirty seconds, the pressure is released, and the film sample is retrieved from the press.

X-ray diffraction patterns from this film sample, recorded by using nickel filtered CuK$_\alpha$ radiation and flat plate photographic techniques, indicate a random orientation of polymer molecular axes.

Molecular alignment of the polymer molecule axes is achieved in the following manner. The film sample is sandwiched between two Kapton films of 0.002 inch thickness which in turn are sandwiched between two metal plates of 0.25 inch thickness, each having a ground flat surface and a rod attached to one side which serves as a contact for application of voltage in the alignment procedure. The sub-assembly is covered on top and bottom with a double layer of Kapton sheets of 0.002 inch thickness and providing a 0.004 inch electrical insulating layer against each platen.

The whole assembly is placed between the platens of the press previously employed for preparing the unoriented precursor film sample. The platens are preheated to 290° C., then closed and a pressure of 6 tons is applied. Wires from a DC power supply are attached to the rods of the electrode plates and a voltage of 700 V is applied for two hours while maintaining temperature and pressure.

The press is cooled rapidly to 150° C. while pressure and voltage are maintained. At that temperature, the voltage is reduced to zero and the pressure released. The molecularly aligned film sample is retrieved from the mold, and X-ray diffraction patterns are recorded with nickel filtered $CuK_\alpha$ Orientation functions are determined utilizing a polar table and a microdensitometer interfaced with a LeCray computer.

The data demonstrate that the molecular alignment process results in a rotation of essentially all of the molecular axes of the polymer molecules out of the film plane into a direction parallel to that of the external field. This type of molecularly aligned polymer film is noncentrosymmetric and can function as a second-order harmonic-generating nonlinear optical medium for a high intensity light field to which the medium is optically clear, e.g., as the nonlinear optical component in a laser frequency converter device, with a Miller's delta of at least about one square meter/coulomb.

What is claimed is:

1. A thermoplastic polymer which consists of recurring structural units corresponding to the formula:

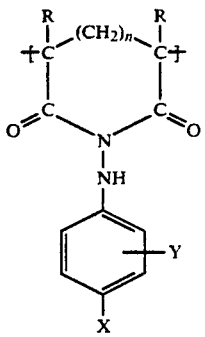

where R is a substituent selected from hydrogen or alkyl groups, n is the integer zero or one, X is a substituent selected from nitro, cyano, trifluoromethyl or tricyanoethylene groups, and Y is a substituent selected from hydrogen, alkyl, nitro or cyano groups.

2. A thermoplastic polymer in accordance with claim 1 wherein the weight average molecular weight of the polymer is between about 500–500,000.

3. A thermoplastic polymer in accordance with claim 1 wherein the repeating structural units comprise at least 10 weight percent of the total polymer weight.

4. A thermoplastic polymer in accordance with claim 1 wherein X is nitro and Y is hydrogen.

5. A thermoplastic polymer in accordance with claim 1 wherein X is nitro and Y is nitro.

6. A thermoplastic polymer in accordance with claim 1 wherein X is cyano and Y is hydrogen.

7. A thermoplastic polymer in accordance with claim 1 wherein X is trifluoromethyl and Y is hydrogen.

8. A thermoplastic polymer in accordance with claim 1 wherein X is tricyanoethylene and Y is hydrogen.

9. A thermoplastic polymer in accordance with claim 1 wherein R is hydrogen.

10. A thermoplastic polymer in accordance with claim 1 wherein R is methyl.

11. A nonlinear optical medium comprising a substrate of a thermoplastic polymer which consists of recurring structural units corresponding to the formula:

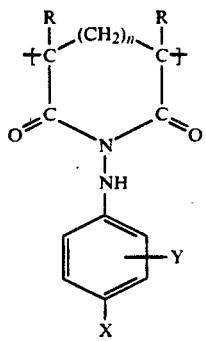

where R is a substituent selected from hydrogen and alkyl groups, n is the integer zero or one, X is a substituent selected from nitro, cyano, trifluoromethyl or tricyanoethylene groups, and Y is a substituent selected from hydrogen, alkyl, nitro or cyano groups.

12. A nonlinear optical medium in accordance with claim 11 wherein the substrate is in the form of an optically transparent film.

13. A nonlinear optical medium in accordance with claim 11 wherein the substrate is noncentrosymmetric and exhibits second order nonlinear optical response.

14. A nonlinear optical medium in accordance with claim 11 wherein the substrate is centrosymmetric and exhibits third order nonlinear optical response.

15. An optical medium in accordance with claim 11 which is contained as a nonlinear optical component in an optical device.

* * * * *